United States Patent
Teboulle et al.

(10) Patent No.: US 12,026,489 B2
(45) Date of Patent: Jul. 2, 2024

(54) METHOD OF DOWNLOADING SOFTWARE TO A PLURALITY OF METERS

(71) Applicant: SAGEMCOM ENERGY & TELECOM SAS, Rueil Malmaison (FR)

(72) Inventors: Henri Teboulle, Rueil Malmaison (FR); Franck Harnay, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 235 days.

(21) Appl. No.: 17/192,559

(22) Filed: Mar. 4, 2021

(65) Prior Publication Data

US 2021/0286605 A1 Sep. 16, 2021

(30) Foreign Application Priority Data

Mar. 10, 2020 (FR) ...................................... 20 02361

(51) Int. Cl.
*G06F 9/44* (2018.01)
*G06F 8/60* (2018.01)
*H04L 67/52* (2022.01)

(52) U.S. Cl.
CPC ................ *G06F 8/60* (2013.01); *H04L 67/52* (2022.05)

(58) Field of Classification Search
CPC ........................................................ G06F 8/60
USPC ........................................................ 717/173
See application file for complete search history.

(56) References Cited

U.S. PATENT DOCUMENTS

| 8,416,741 B2* | 4/2013 | Chan | H04W 88/06 455/452.2 |
| 10,757,000 B2* | 8/2020 | Gelvin | H01Q 9/0464 |
| 10,862,784 B2* | 12/2020 | Kagan | G01D 4/004 |
| 2010/0057703 A1* | 3/2010 | Brandt | G06F 21/10 707/E17.014 |
| 2014/0173579 A1* | 6/2014 | McDonald | G06F 8/65 717/172 |
| 2018/0213496 A1* | 7/2018 | Norair | H04L 43/0847 |

FOREIGN PATENT DOCUMENTS

| EP | 2661050 A1 | 11/2013 |
| EP | 3182281 A1 | 6/2017 |
| WO | WO-2005/015890 A1 | 2/2005 |

* cited by examiner

*Primary Examiner* — Evral E Bodden
(74) *Attorney, Agent, or Firm* — Muncy, Geissler, Olds & Lowe, P.C.

(57) ABSTRACT

A method for downloading software to a plurality of meters (M1, M2, . . . , MN) via a plurality of data concentrators (DC A, DC B, . . . ) includes the steps of: mapping the positions of the meters and of the data concentrators; defining a plurality of subnetworks, each comprising data concentrators; associating each subnetwork with a downloading date comprising, the downloading date of each subnetwork being different from the downloading dates of the other subnetworks; transmitting to the data concentrators of each subnetwork the downloading date associated with said subnetwork so that, when the downloading date associated with said subnetwork is reached, all of the data concentrators of said subnetwork download the software to all of the meters that are positioned within communication range of the data concentrators of said subnetwork.

17 Claims, 2 Drawing Sheets

METHOD OF DOWNLOADING SOFTWARE TO A PLURALITY OF METERS

The invention relates to the field of energy management networks.

BACKGROUND OF THE INVENTION

Nowadays, in a large number of countries, huge networks of smart of meters (gas meters, water meters, electricity meters) are being deployed massively on a nationwide scale.

Each such network typically comprises several million meters, together with data concentrators and information systems (IS). In a network comprising several million meters, there are typically to be found several thousand data concentrators.

Each of these entities (meter, data concentrator, IS) is provided with communication means that may use a variety of technologies (radio communication with various protocols, communication over cellular networks, powerline carriers, etc.) and that make uplink and downlink transmission possible within the network.

These communication means are used in particular for downloading software to the meters. By way of example, the downloaded software may be so-called "firmware" (i.e. software for providing low-level control over specific hardware).

In an existing network of gas meters that is currently being deployed, firmware is downloaded to all of the meters of said network by using a method that consists in associating each meter with a single data concentrator, and by sending the firmware for downloading to all of the meters via their associated data concentrators, over a period of a week. Beforehand, each meter receives a unique downloading date (comprising both a day and a time) from the associated data concentrator via a unicast transmission, thereby defining a rendezvous for performing the download.

It frequently happens that downloading fails. A "sweep" method is thus performed in order to restart the process for those gas meters that have not received the download. In spite of that, it is found that there remain numerous gas meters that have not received the download correctly. This observation is made easily: specifically, in the network in question, each gas meter specifies the version of the firmware that it is implementing in each of the collection frames that it transmits regularly to the associated data concentrator.

OBJECT OF THE INVENTION

An object of the invention is to download software quickly and effectively to a large number of smart meters.

SUMMARY OF THE INVENTION

In order to achieve this object, there is provided a downloading method that is performed in a server such as a server of an information system for the purpose of downloading software to a plurality of meters via a plurality of data concentrators, the method comprising the steps of:
mapping the positions of the meters and of the data concentrators;
defining a plurality of subnetworks, each comprising a plurality of data concentrators;
associating each subnetwork with at least one downloading date comprising a day and a time, the downloading date of each subnetwork being different from the downloading dates of the other subnetworks;
transmitting to the data concentrators of each subnetwork the downloading date associated with said subnetwork so that, when the downloading date associated with said subnetwork is reached, all of the data concentrators of said subnetwork download the software to all of the meters that are positioned within communication range of the data concentrators of said subnetwork.

Thus, at the downloading date associated with a subnetwork, the data concentrators of said subnetwork download the software to all of the meters that are within communication range of said data concentrators. Each meter, which is generally visible to a plurality of data concentrators belonging to different subnetworks, can thus receive downloads from the various data concentrators at different downloading dates.

Once the data concentrators of all of the subnetworks have performed the downloading, i.e. once the successive downloading dates have all passed, the probability that all of the meters have received the download correctly is very high. Furthermore, when the downloading method of the invention is performed, it is possible to estimate very accurately the total duration needed for downloading to all of the meters, since the method comes to an end when the data concentrators of all of the subnetworks have performed the scheduled downloading. Unlike the presently-existing solution, there is no need to perform the sweep method in order to organize additional downloading operations.

There is also provided a method as described above, wherein the subnetworks are defined in such a manner that each data concentrator of each subnetwork is positioned outside the communication range of the other data concentrators of said subnetwork.

There is also provided a method as described above, wherein the subnetworks are defined in such a manner that each meter is positioned within communication range of at most one data concentrator per subnetwork.

There is also provided a method as described above, wherein the software is transmitted to each data concentrator of each subnetwork while transmitting to said data concentrator the downloading date associated with said subnetwork.

There is also provided a method as described above, wherein the transmission to each data concentrator of each subnetwork of the downloading date associated with said subnetwork is unicast transmission.

There is also provided a method as described above, wherein, for each subnetwork, the downloading of the software by each data concentrator of said subnetwork to the meters that are positioned within communication range of said data concentrator is performed via broadcast transmission.

There is also provided a method as described above, wherein, when the downloading date associated with a subnetwork is reached, each meter that is positioned within communication range of a data concentrator of said subnetwork wakes up and opens a listening window during which the software is downloaded to the meter by said data concentrator.

There is also provided a method as described above, wherein, if the software is correctly downloaded to the meter, the meter does not wake up again if it receives a downloading date for the same software.

There is also provided an information system including a processor component that performs the downloading method as described above.

There is also provided a computer program including instructions that cause the above-described information system to execute the steps of the above-described downloading method.

There is also provided a computer readable storage medium, having stored thereon the computer program as described above.

There is also provided a downloading method that is performed in a data concentrator for the purpose of downloading software to a plurality of meters that are positioned within communication range of said data concentrator, the method comprising the steps of:
  acquiring the software;
  acquiring at least one downloading date comprising a day and a time;
  transmitting the downloading date to the meters;
  when the downloading date is reached, downloading the software to all of the meters.

There is also provided a method as described above, wherein the data concentrator acquires the software while acquiring the downloading date.

There is also provided a method as described above, wherein the downloading date is transmitted to each meter by unicast transmission.

There is also provided a method as described above, wherein the software is downloaded to the meters via broadcast transmission.

There is also provided a method as described above, wherein, when the downloading date is reached, each meter that is positioned within communication range of the data concentrator wakes up and opens a listening window during which the software is downloaded to the meter by said data concentrator.

There is also provided a method as described above, wherein, if the software is correctly downloaded to the meter, the meter does not wake up again if it receives a downloading date for the same software.

There is also provided a data concentrator, in which the above-described downloading method is performed.

There is also provided a computer program including instructions that cause the above-described data concentrator to execute the steps of the above-described downloading method.

There is also provided a computer readable storage medium, having stored thereon the computer program as described above.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

The downloading method of the invention enables software to be downloaded to a plurality of meters via a plurality of data concentrators in an orderly manner. The downloading method is performed in a network that comprises not only the meters and the data concentrators, but also an information system (IS), itself comprising one or more servers.

By way of example, the meters may be gas meters. By way of example, the software is firmware.

Each meter includes a first communication module. Each data concentrator includes a first communication module and a second communication module. The IS includes a second communication module.

The meters and the data concentrators can communicate via the first communication modules. The data concentrators and the IS can communicate via the second communication modules.

The communication modules may make use of various technologies. In this example, the first communication modules of the meters and of the data concentrators are adapted to communicate by radio using the Wize standard operating at the frequency of 169 megahertz (MHz), while the second communication modules of the data concentrators and of the IS are adapted to communicate via a 2G, 3G, or 4G cellular network.

Each entity from among the data concentrators, the meters, and the IS includes at least one processor component adapted to execute instructions of a program in order to perform at least some of the steps of the downloading method that is described below. The processor components may naturally differ between the entities, and by way of example each processor component may be a microcontroller, a processor, or indeed a programmable logic circuit such as a field programmable gate array (FPGA) or an application specific integrated circuit (ASIC).

Figure 1:
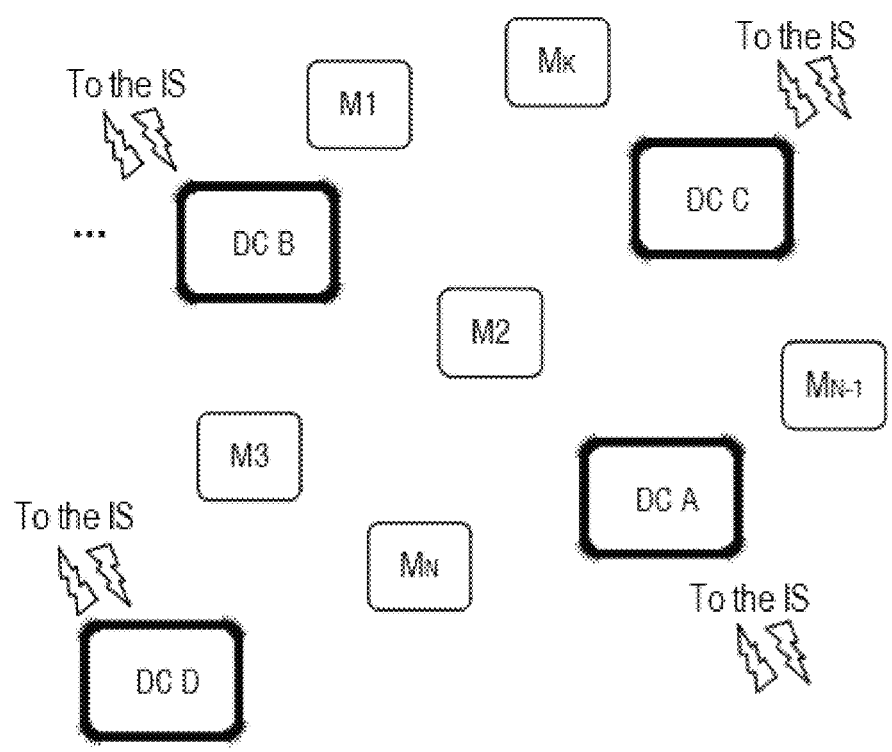
FIG. 1 shows meters and data concentrators.

In FIG. 1, there can be seen a plurality of meters M1, M2, . . . , MK, . . . , MN, each of which is positioned within communication range of a plurality of data concentrators.

In this example, when two entities are said to be "positioned within communication range" of each other, it should be understood that the communication means with which those two entities are equipped and the positioning of those two entities make it possible not only for those two entities to detect each other (or at least for one of those two entities to detect the other one), but also that those two entities are capable of communicating.

Thus, in FIG. 1:
  the meter M1 is positioned within communication range of the data concentrators DC B and DC C;
  the meter M2 is positioned within communication range of the data concentrators DC A, DC B, and DC C;
  the meter M3 is positioned within communication range of the data concentrators DC A, DC B, and DC D;
  the meter MK is positioned within communication range of the data concentrators DC B and DC C;
  the meter MN-1 is positioned within communication range of the data concentrators DC A and DC C;
  the meter MN is positioned within communication range of the data concentrators DC A and DC D.

Each meter being positioned within communication range of a plurality of data concentrators agrees well with the actual situation of a real network of meters. Specifically, in a very large network of gas meters, that might have several million meters, the number of data concentrators is also very large, and the geographical distribution of the data concentrators is such that, in general manner, each meter can indeed "see" a plurality of data concentrators (i.e. is positioned within communication range of them).

The downloading method consists firstly in mapping the positions of the meters and of the data concentrators, and then in defining a plurality of subnetworks, each comprising a plurality of data concentrators. Each of these subnetworks is defined by a method similar to hexagonal type geographical meshing (like the GSM cellular network). In this example, these operations are performed in the IS.

The data concentrator subnetworks are defined in such a manner that each data concentrator of each subnetwork is positioned outside the communication range of the other data concentrators of said subnetwork. Thus, within any one subnetwork, the data concentrators cannot "see" one another.

Furthermore, the data concentrator subnetworks are defined in such a manner that each meter is positioned within communication range of at most one data concentrator per subnetwork.

Consequently, in FIG. 1, the data concentrators DC A, DC B, DC C, and DC D belong to distinct subnetworks.

The downloading method then consists in associating each subnetwork with at least one downloading date comprising a day and a time, the downloading date of each subnetwork being different from the downloading dates of the other subnetworks.

In this example, the term "downloading date" is thus used to mean a specified time on a particular day (and it is naturally possible to have a plurality of downloading dates per day).

The IS then transmits to the data concentrators of each subnetwork the downloading date associated with said subnetwork. Each data concentrator then transmits the downloading date to the meters that are positioned within transmission range of said data concentrator.

The IS transmits to each data concentrator of each subnetwork the downloading date associated with said subnetwork by using unicast transmission. Likewise, each data concentrator transmits the downloading date to the meters positioned within communication range of said data concentrator by using unicast transmission.

The IS thus transmits the downloading date to each data concentrator by means of a unicast command. When this command has been received correctly, the data concentrator in question returns an acknowledgement frame to the IS. These exchanges of commands and of frames between the IS and the data concentrators make use of http POST requests and of the TR-69 protocol. In parallel, each data concentrator transmits the downloading date to all of the meters that are positioned within transmission range of said data concentrator by means of a unicast command via radio communication using the Wize standard operating at the frequency of 169 MHz. Whenever a meter sends a collection frame, it always opens a listening window, which means that the meters can always receive the unicast commands that are sent to them by the data concentrators.

Figure 2:
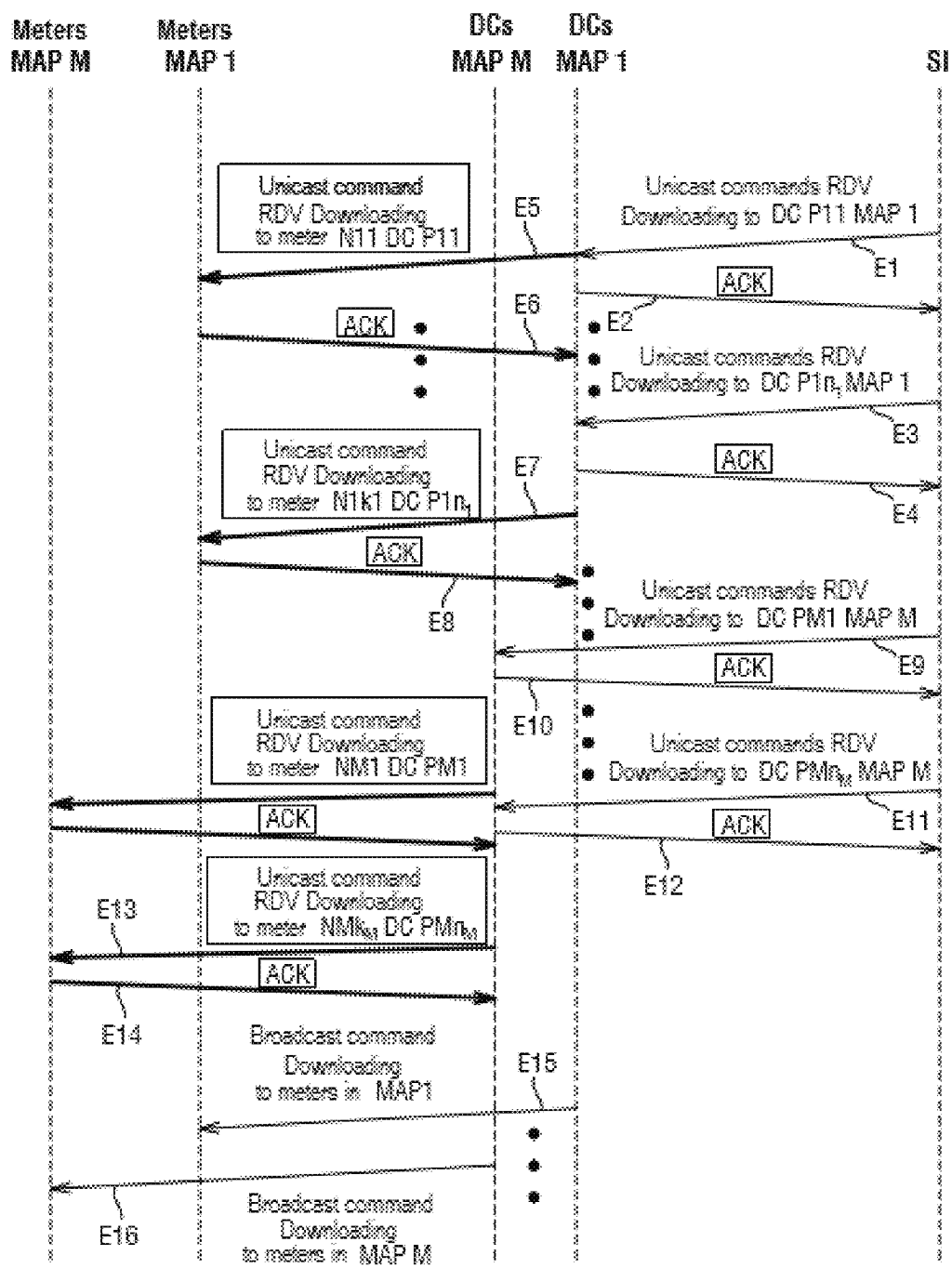
FIG. 2 shows commands and messages exchanged between an IS, data concentrators, and meters while performing the downloading method of the invention.

FIG. 2 shows a configuration in which M subnetworks of data concentrators have been set up: MAP 1, MAP 2, . . . , MAP M.

The subnetwork MAP 1 comprises $n_1$ data concentrators (referenced P1 to $P1n_1$); $k_1$ meters (referenced N11 to $N1k_1$) are positioned within communication range of these $n_1$ data concentrators.

The subnetwork MAP 2 comprises $n_2$ data concentrators (referenced P21 to $P2n_2$); $k_2$ meters (referenced N21 to $N2k_2$) are positioned within communication range of these $n_2$ data concentrators; . . .

The subnetwork MAP M comprises $n_M$ data concentrators (referenced PM1 to $PMn_M$); $k_M$ meters (referenced NM1 to $NMk_M$) are positioned within communication range of these $n_M$ data concentrators.

The IS thus begins by transmitting the unicast command containing the downloading date associated with the subnetwork MAP 1 to the data concentrator P11 (step E1), which returns an acknowledgement frame (step E2). These operations are repeated for all of the data concentrators of the subnetwork MAP 1, and they come to an end, for the subnetwork MAP 1, once the IS has transmitted the unicast command containing the downloading date associated with the subnetwork MAP 1 to the data concentrator P1ni (step E3), which returns an acknowledgement frame (step E4).

In parallel, still for the subnetwork MAP 1, the data concentrator P11 of the subnetwork MAP 1 transmits to the meter N11 the unicast command containing the downloading date associated with the subnetwork MAP 1 (step E5). The meter N11 returns an acknowledgement frame (step E6). These operations are repeated for all of the data concentrators of the subnetwork MAP 1 and for all of the associated meters. For the subnetwork MAP 1, these operations come to an end once the data concentrator $P1n_1$ has transmitted the unicast command to the meter Nlki (step E7) and that meter has returned an acknowledgement frame (step E8).

These operations are also repeated for all of the subnetworks, up to the subnetwork MAP M.

Thus, for the subnetwork MAP M, the IS transmits the unicast command containing the downloading date associated with the subnetwork MAP M to the data concentrator PM1 (step E9), which returns an acknowledgement frame (step E10). These operations are repeated for all of the data concentrators of the subnetwork MAP M and for all of the associated meters, until the IS has transmitted the unicast command containing the downloading date associated with the subnetwork MAP M to the data concentrator $PMn_M$ (step E11), which returns the acknowledgement frame (step E12), and until the data concentrator $PMn_M$ has transmitted the unicast command to the meter $NMk_M$ (step E13), which returns the acknowledgement frame (step E14).

A plurality of downloading dates corresponding to a plurality of subnetworks are thus sent to each meter that is positioned within communication range of data concentrators belonging to those (different) subnetworks. Each of these meters thus acquires a plurality of different downloading dates.

It should be observed that the software (firmware) itself is transmitted to each data concentrator of each subnetwork while transmitting the downloading date associated with said subnetwork to said data concentrator, i.e. while the IS is transmitting the unicast commands that include the downloading dates.

Thereafter, for each subnetwork, when the downloading date associated with said subnetwork is reached, all of the data concentrators of said subnetwork download the software to all of the meters that are positioned within communication range of the data concentrators of said subnetwork.

For each subnetwork, the data concentrators of said subnetwork download the software to the meters that are positioned within communication range of said data concentrators by means of broadcast transmission. The software is downloaded to the meters by radio communication using the Wize standard operating at the frequency of 169 MHz.

Thus, in FIG. 2, at the downloading date associated with the subnetwork MAP 1, the data concentrators of the subnetwork MAP 1 download the software to the meters that are positioned within communication range of the data concentrators of the subnetwork MAP 1 (step E15).

This operation is also performed for the subnetworks MAP 2, MAP 3, etc., up to the subnetwork MAP M: at the downloading date associated with the subnetwork MAP M, the data concentrators of the subnetwork MAP M download the software to the meters that are positioned within communication range of the data concentrators of the subnetwork MAP M (step E16).

More precisely, when the downloading date associated with a subnetwork is reached, each meter that is positioned within communication range of a data concentrator of said subnetwork wakes up and opens a listening window during which the software is downloaded to the meter by said data concentrator.

Thus, at each downloading date, which corresponds to a rendezvous day and time for the data concentrators of a subnetwork and for the meters positioned within communication range of said data concentrators, the meters in question wake up and listen for downloading, it being understood that their clocks might present a certain amount of error and that they take account of the uncertainty concerning time by opening early and calibrating the listening window.

It should be observed that, for each meter, if the software is correctly downloaded to the meter, the meter does not wake up again if it receives another downloading date for the same software.

The invention thus relies on the assumption that all of the data concentrators of the network are suitable for calling the meters. Downloading is thus scheduled for all of the data concentrators. In this way, all of the meters are much more likely to receive downloads at the scheduled downloading dates. This serves to avoid using the "sweep" method, although it can nevertheless be retained as a precaution for the (very) rare meters that do not receive downloads.

Naturally, the invention is not limited to the embodiment described, but covers any variant coming within the ambit of the invention as defined by the claims.

In the description, each subnetwork is associated with a single downloading date. Each subnetwork (or some of the subnetworks) may be associated with a plurality of downloading dates, providing it is ensured that all these downloading dates are indeed different from one another in order to avoid any "collisions".

The invention may be performed with any type of meter: water meter, gas meter, electricity meter, etc.

The invention claimed is:

1. A downloading method that is performed in a server connected to a network for downloading software to a plurality of meters via data concentrators connected to the network, the method comprising the steps of:
    mapping the positions of the meters and of the data concentrators within the network;
    defining a plurality of subnetworks in the network, each comprising plural ones of the data concentrators;
    associating each subnetwork with at least one downloading date comprising a day and a time, the downloading date of each subnetwork being different from the downloading dates of the other subnetworks;
    transmitting to the data concentrators of each subnetwork the downloading date associated with said subnetwork via the network so that, when the downloading date associated with said subnetwork is reached, all of the data concentrators of said subnetwork download, via the network, the software to all of the meters that are positioned within communication range of the data concentrators of said subnetwork.

2. The method according to claim 1, wherein the subnetworks are defined in such a manner that each data concentrator of each subnetwork is positioned outside the communication range of the other data concentrators of said subnetwork.

3. The method according to claim 1, wherein the subnetworks are defined in such a manner that each meter is positioned within communication range of at most one data concentrator per subnetwork.

4. The method according to any claim 1, wherein the software is transmitted to each data concentrator of each subnetwork while transmitting to said data concentrator the downloading date associated with said subnetwork.

5. The method according to claim 1, wherein the transmission to each data concentrator of each subnetwork of the downloading date associated with said subnetwork is unicast transmission.

6. The method according to claim 1, wherein, for each subnetwork, the downloading of the software by each data concentrator of said subnetwork to the meters that are positioned within communication range of said data concentrator is performed via broadcast transmission.

7. The method according to claim 1, wherein, when the downloading date associated with a subnetwork is reached, each meter that is positioned within communication range of a data concentrator of said subnetwork wakes up and opens a listening window during which the software is downloaded to the meter by said data concentrator.

8. The method according to claim 7, wherein, if the software is correctly downloaded to the meter, the meter does not wake up again if it receives a downloading date for the same software.

9. An information system including a processor component that performs the downloading method according to claim 1.

10. A non-transitory computer readable storage medium having stored thereon a computer program including instructions that cause an information system to execute the downloading method according to claim 1.

11. A downloading method that is performed in a data concentrator for the purpose of downloading software to a plurality of meters that are positioned within communication range of said data concentrator, the method comprising the steps of:
    acquiring the software;
    acquiring at least one downloading date comprising a day and a time;
    transmitting the downloading date to the meters;
    when the downloading date is reached, downloading the software to all of the meters,
    wherein the downloading date is transmitted to each meter by unicast transmission.

12. A method according to claim 11, wherein the data concentrator acquires the software while acquiring the downloading date.

13. The method according to claim 11, wherein the software is downloaded to the meters via broadcast transmission.

14. The method according to claim 11, wherein, when the downloading date is reached, each meter that is positioned within communication range of the data concentrator wakes up and opens a listening window during which the software is downloaded to the meter by said data concentrator.

15. The method according to claim 14, wherein, if the software is correctly downloaded to the meter, the meter does not wake up again if it receives a downloading date for the same software.

16. A data concentrator that performs the downloading method according to claim 11.

17. A non-transitory computer readable storage medium having stored thereon the computer program including instructions that cause a data concentrator to execute the downloading method according to claim 11.

* * * * *